April 29, 1924.

A. B. LEECH

LIGHT TRANSMITTING STRUCTURE

Original Filed Oct. 18, 1919

1,492,472

Witnesses:

INVENTOR.
Aubrey B. Leech
BY
ATTORNEY

Patented Apr. 29, 1924.

1,492,472

UNITED STATES PATENT OFFICE.

AUBREY B. LEECH, OF LOS ANGELES, CALIFORNIA.

LIGHT-TRANSMITTING STRUCTURE.

Applicatoin filed October 18, 1919, Serial No. 331,683. Renewed December 18, 1922.

*To all whom it may concern:*

Be it known that I, AUBREY B. LEECH, a citizen of the United States, residing at Los Angeles, in the county of Los Angeles and State of California, have invented a new and useful Light-Transmitting Structure, of which the following is a specification.

This invention relates to a structure formed in part by a foraminous member and in part by a transparent or translucent membrane or film covering the foraminous member and closing the interstices.

An object of the invention is to provide a light-transmitting structure which will serve as a ground or backing for the reception of color pigments.

Another object is to provide a transparent panel on which a design or picture may be painted with transparent colors so that the picture or design painted on the panel may be properly illuminated by light transmitted therethrough.

The invention is especially useful in the construction of illuminated signs and can be used with good effect to take the place of the glass panels and transparent picture ordinarily used in the fronts of illuminated sign boxes and when so used a picture or design may be painted in transparent colors on the panel so that the light transmitted therethrough will illuminate the color pigments.

The invention may also be used in the form of letters or other cut-out characters, and the structure may be shaped, preferably by forming the foraminous member before it is coated with the film-forming compound, into convex shapes.

The accompanying drawings illustrate the invention:

Figure 1:
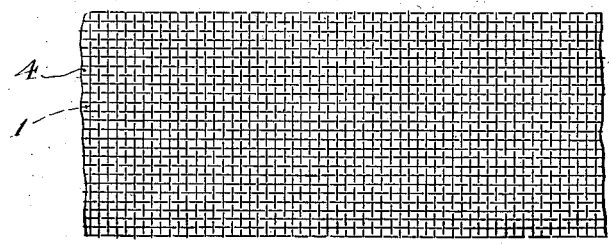
Figure 1 is a face view of a light-transmitting structure made in accordance with the provisions of this invention.
Figure 2:
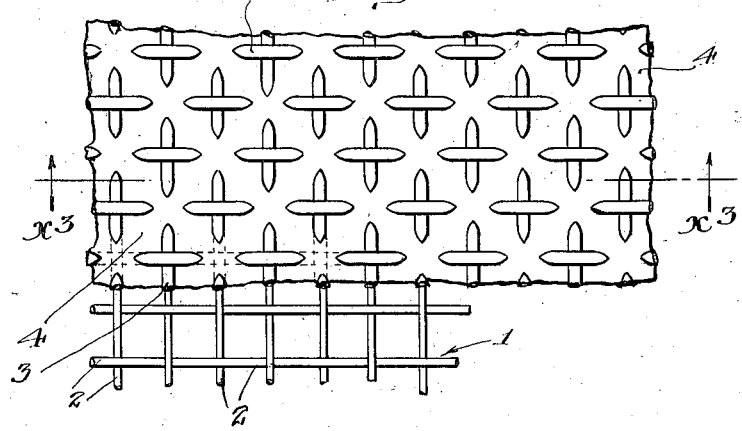
Fig. 2 is an enlarged or magnified face view of a portion of the panel shown in Fig. 1.
Figure 3:
Fig. 3 is a sectional elevation on line indicated by $x^3$—$x^3$, Fig. 2.

A foraminous or perforate member indicated in general by the character 1 is formed of any suitable material and in the particular instance shown in the drawings comprises interlaced wires 2 to form an ordinary woven wire screen. The foraminous member is then dipped in or otherwise covered with a membrane or film-forming material or compound. This film coats the wires as indicated at 3 and forms flat surfaces 4 in the interstices. The composition of such material may vary according to the results sought. The ingredients of the composition are such as to transmit light rays and may be such as to secure a transparent membrane or film or a translucent one. The composition which I employ at present for producing a translucent membrane is known to the trade as pyroline.

After the dipping operation is completed the panel thus produced is allowed to dry and is then ready for the reception of paint pigments which will be applied with a brush in the usual manner of applying oil or transparent or water color paints so as to produce any desired picture or design on the panel.

The painted panel is now ready for exhibiting and may be placed in the opening of a box or case provided with a lamp or lamps adapted to produce the requisite illumination of the picture or design painted on the panel.

Figure 4:
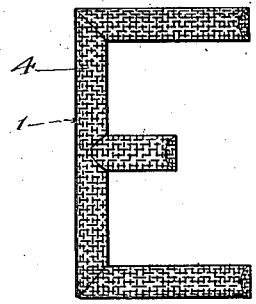
Fig. 4 is a front elevation of a character embodying the invention.
Figure 5:
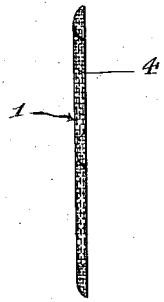
Fig. 5 is an edge view of the character in Fig. 4.

If it be desired to produce a letter or other printed character in relief, the foraminous member will preferably first be cut or stamped and pressed into the desired shape and then the stamped or pressed member will be dipped as above described to produce the film covering. A letter made in this fashion is represented in Figs. 4 and 5 and letters of this description may be used in lieu of the expensive glass ones at present employed extensively in the advertising legends of moving picture theaters.

The invention is not limited to the use of the composition noted above, but any suitable composition of a yielding adherent gelatine-like character may be used, so as to produce a surface to which oil or transparent colors will adhere. The completed structure is flexible and can be bent and rolled without destroying the film.

I claim:

1. A new article of manufacture comprising a flexible foraminous member in the form of a printed character in relief, and a yielding adherent light-transmitting film filling the interstices of the foraminous member.

2. A new article of manufacture comprising a woven wire screen, and a bendable light-transmitting gelatine-like film covering the wire and forming flat surfaces in the interstices of the screen, said membrane bending without breaking when the screen is bent or rolled.

Signed at Los Angeles, California, this 3d day of October, 1919.

AUBREY B. LEECH.

Witnesses:
GEORGE H. HILES,
L. BELLE WEAVER.